United States Patent
Rozek et al.

(10) Patent No.: US 6,204,209 B1
(45) Date of Patent: Mar. 20, 2001

(54) ACOUSTICAL COMPOSITE HEADLINER

(75) Inventors: Harry J. Rozek, Watkinsville, GA (US); Dennis J. Beard, Holland, MI (US); Marie-Christine Knorr, Herrlisheim; Christoph Jung, Uberach, both of (FR)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 09/058,645

(22) Filed: Apr. 10, 1998

(51) Int. Cl.[7] ........................................ B32B 5/24
(52) U.S. Cl. .................. 442/374; 442/370; 442/373; 428/317.1; 428/354; 428/355 EP
(58) Field of Search .................. 428/317.1, 354, 428/355 EP; 442/370, 373, 374

(56) References Cited

U.S. PATENT DOCUMENTS

| | | | |
|---|---|---|---|
| 4,028,477 | * 6/1977 | Goppel | 428/285 |
| 4,283,457 | * 8/1981 | Kolsky | 428/285 |
| 4,352,522 | 10/1982 | Miller . | |
| 4,418,031 | 11/1983 | Doerer et al. . | |
| 4,474,846 | 10/1984 | Doerer et al. . | |
| 4,476,183 | * 10/1984 | Holtrop | 428/286 |
| 4,521,477 | 6/1985 | Kiss . | |
| 4,557,970 | * 12/1985 | Holtrop | 428/316.6 |
| 4,695,501 | * 9/1987 | Robinson | 428/159 |
| 4,840,832 | 6/1989 | Weinle et al. . | |
| 4,851,283 | * 7/1989 | Holtrop | 428/284 |
| 4,948,661 | 8/1990 | Smith et al. . | |
| 4,950,439 | 8/1990 | Smith et al. . | |
| 5,049,439 | * 9/1991 | Robinson | 428/286 |
| 5,068,001 | 11/1991 | Haussling . | |
| 5,298,694 | 3/1994 | Thompson et al. . | |
| 5,486,256 | * 1/1996 | Romesberg | 156/251 |
| 5,551,755 | 9/1996 | Lindberg . | |
| 5,817,408 | * 10/1998 | Orimo | 428/218 |
| 5,942,321 | * 8/1999 | Romesberg | 428/300.7 |

FOREIGN PATENT DOCUMENTS

| | | |
|---|---|---|
| 3233385 | 5/1984 | (DE) . |
| 2739642 | 6/1988 | (DE) . |
| 3439732 | 9/1988 | (DE) . |
| 0146519 | 6/1985 | (EP) . |
| 0146520 | 6/1985 | (EP) . |
| 0146521 | 6/1985 | (EP) . |

\* cited by examiner

*Primary Examiner*—Elizabeth M. Cole
*Assistant Examiner*—Ula C. Ruddock
(74) *Attorney, Agent, or Firm*—Price, Heneveld, Cooper, DeWitt & Litton

(57) ABSTRACT

A thermoformed contoured three-dimensional laminated structure having improved sound absorbing characteristics and which can be formed with shorter mold cycle times includes a porous thermoformable fibrous batt layer and a rigid foam layer. The laminated articles are suitable for use as decorative sound absorbing panels for automotive applications, and are well suited for use as vehicle headliners.

27 Claims, 1 Drawing Sheet

ACOUSTICAL COMPOSITE HEADLINER

BACKGROUND OF THE INVENTION

This invention relates to vehicle headliners and a method of forming vehicle headliners, and more particularly to vehicle headliners comprising a plurality of thermoformable layers which are compressed and molded to form a laminate having a predetermined contoured shape.

Many vehicle headliners have been constructed utilizing resin impregnated glass fiber. A resin impregnated glass fiber batt is compression molded into the desired headliner shape, and the resin is cured to maintain the molded shape. A thin layer of foam, such as polyurethane, overlies the molded fiberglass shape, and fabric is attached to the foam to form the exposed interior surface of the headliner. Because the glass fiber reinforced layer of such headliners is a rigid, often impermeable layer, it tends to reflect sound. Accordingly, undesirable ambient noises, including noise from the engine compartment or drive train, which enter the cabin are not absorbed by the headliner, but instead are reflected back into the cabin by the fiber reinforced resin layer.

Another type of vehicle headliner is prepared by thermoforming a laminate comprised of a stiff structural, yet thermoformable polystyrene foam layer and layers of kraft paper or a polymer film material bonded to either side of the foam. This laminate is covered with a soft foam backed fabric. Such headliners do not have sufficiently desirable sound absorbing properties because the kraft paper or polymer film tends to reflect sound rather than absorb sound.

A sound absorbing laminate which is useful for forming three-dimensionally contoured articles such as automobile headliners, and which exhibits substantially improved sound absorbing properties, is disclosed in U.S. Pat. No. 5,068,001, the rights of which have been assigned to Prince Corporation, Holland, Mich., the Assignee of the present invention. The laminate is comprised of a resilient, porous fibrous core layer, to which is adhered a fibrous, porous reinforcing mat to give the composite strength. The three-dimensional sound absorbing structure is generally formed by providing a first reinforcing porous, fibrous mat, providing a core defined by a resilient thermoformable porous fiber batt having a thickness of at least about ¼ inch, laminating the mat to one surface of the batt by impregnating the mat and its interface with the batt with sufficient binder resin to effect adherence therebetween, but insufficient resin binder to form a porosity-blocking film, and thermoforming the laminate into a porous three-dimensional configuration. While the sound absorbing laminate described in U.S. Pat. No. 5,068,001 provides substantially improved sound absorbing properties as compared with other known vehicle headliner constructions, vehicle manufacturers desire even better sound absorbing properties, and in particular desire headliner constructions which are capable of exhibiting excellent sound absorbing properties for particular frequency ranges depending on the characteristics of the vehicle. Also, while the method described in U.S. Pat. No. 5,068,001 is useful for mass producing automobile headliners on automated equipment, the amount of time which the laminate must remain in either a thermoforming molding tool or placed in a cooling fixture having a shape substantially identical with that of the molding tool, in order to form a high quality headliner in the desired three-dimensionally contoured configuration, can be more than is desirable.

SUMMARY OF THE INVENTION

In the present invention, it has been surprisingly found that substantially improved sound absorbing characteristics can be achieved, and that enhanced sound absorbing properties for a particular selected range of sound frequencies can be achieved using a laminate comprising a porous fibrous layer and a porous rigid foam layer. The combination of a porous fibrous layer and a rigid foam layer has been found to provide improved sound absorbing characteristics over substantially the entire range of sound frequencies which can be detected by the human ear. Additionally, the inventors have found that by varying the thickness of the layers and by varying the porosity and density of the rigid foam layer, the headliner can be tuned to exhibit specially enhanced sound absorbing properties for a particularly selected range of frequencies.

In addition to achieving improved sound absorbing characteristics, the three dimensionally contoured panels of the invention can be mass produced at higher production rates, and therefore at a lower cost. More specifically, it has been found that the rigid foam layer helps retain the desired three-dimensionally contoured shape at a higher temperature, whereby the thermoformed three-dimensionally contoured panel can be removed from the thermoforming molding tool at a higher temperature. As a result, shorter cycling times are required and more three-dimensionally configured panels can be produced per unit time for a given thermoforming molding tool.

Another advantage with the present invention is that the laminate comprising a porous fibrous core layer and a rigid foam layer can be thermoformed using the same thermoforming molding tools which are used for producing the three-dimensionally contoured panels described in U.S. Pat. No. 5,068,001. These and other objects, advantages and features of the present invention will be more fully understood and appreciated by reference to the written specification and appended drawings.

DESCRIPTION OF THE PREFERRED EMBODIMENTS

Figure 2:
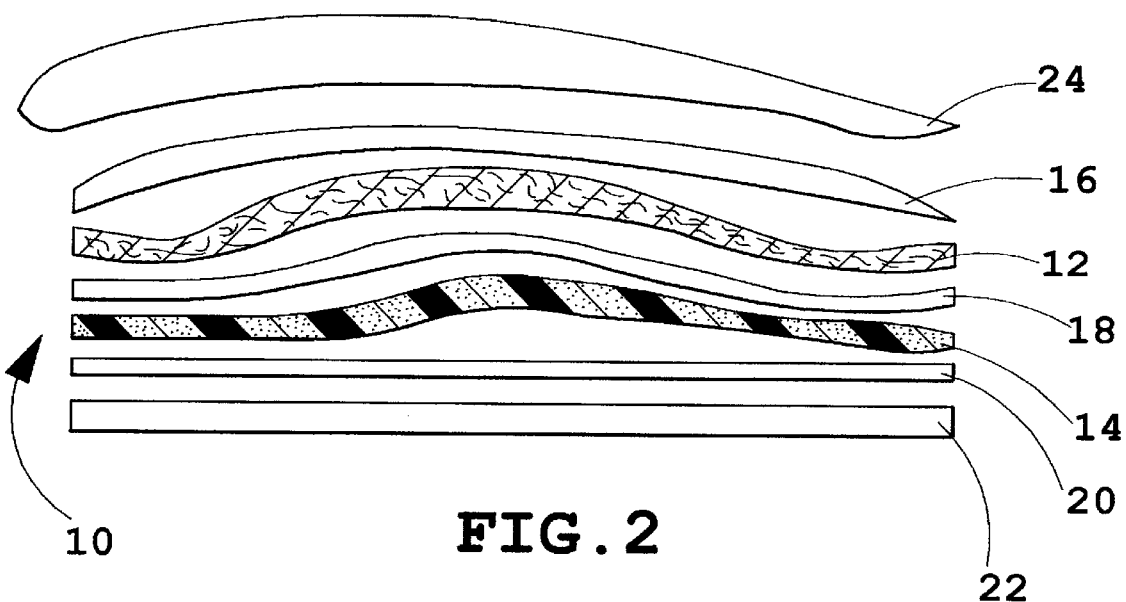
FIG. 2 shows the same structure after molding, again with the laminate layers shown separated for convenient illustration.

In the preferred embodiments, laminate 10 includes a resilient, porous fibrous batt layer 12 and a rigid foam layer 14. Bonded to each side of the porous fibrous batt 12 is a porous reinforcing mat, 16 and 18, respectively. Bonding of the fibrous, porous reinforcing mats 16, 18 to the opposite sides of the porous fibrous batt may be achieved by applying a binding resin to reinforcing mats 16, 18 and/or the opposite surfaces of fibrous batt 12, preferably shortly before the laminate is thermoformed in a thermoforming molding tool. The expression "thermoformed" as used herein refers to a process whereby a laminate is shaped in a molding tool under the influence of heat and pressure. Rigid foam layer 14 is likewise bonded to reinforcing mat 18 on the side opposite the side bonded to fibrous batt 12. Preferably, prior to thermoforming of the laminate, an additional fibrous, porous reinforcing mat 20 is bonded to rigid foam layer 14, on the side thereof opposite the side bonded to fibrous, porous reinforcing mat 18, and a decorative fabric cover 22 is bonded to the side of fibrous, porous reinforcing mat 20 opposite the side bonded to rigid foam 14, and fibrous reinforcing mat 16 is covered by a mold release liner 24. Laminate 10 is moldable to form a predetermined geometrical configuration, typically exhibiting a three-dimensional shape having contoured surfaces characterized by the presence of one or more compound curves (see FIG. 2).

Resilient, non-woven fibrous batt 12 comprises a multitude of directionally or substantially randomly oriented synthetic or natural fibers having a denier of about 4.5 to about 25. Fibrous batt 12 is formed from fibers having a length of from about ½ inch to about 3 inches. Fibrous batt 12 has a thickness of about 15 to 30 millimeters, and more preferably from about 20 to about 25 millimeters prior to being compressed in the thermoforming operation. The weight of fibrous batt 12 is from about 200 +lto about 400 grams per square meter. Fibrous batt 12 of the preferred embodiment is comprised of oriented fibers, wherein a portion of the fibers are preferentially oriented, such as transverse to the planes of the surfaces of the batt. For example, fibrous batt 12 may be needled to cause the fibers to intermesh and to cause a portion of the fibers to orient generally transversely to the planes of the surfaces of the batt. When a substantial portion of the fibers are oriented generally transversed to the planes of the surfaces of the batt, the batt has improved resilience. Resilience and porosity of non-woven batt 12 may be desirable in certain situations and may provide improved sound absorbing/deadening characteristics in certain cases.

The fibers used to form fibrous batt 12 are preferentially thermoformable. It is desirable that the fibers take a set when placed in a heated mold so that they will tend to hold a three-dimensional configuration. Also, it is desirable that the fibers be compressible in a heated thermoforming molding tool so that tight, compact margins can be formed at the edges of the thermoformed article or at edges of openings therein. Fibrous batt 12 may be comprised of synthetic fibers, natural fibers, or a combination thereof. Suitable natural fibers include plant fibers such as cotton. However, thermoplastic fibers are preferred. Suitable thermoplastic fibers include polyester fibers, polyolefin fibers such as polypropylene and polyethylene, and polyamide fibers such as nylon. The selected thermoplastic fibers should have a melting point which is substantially greater than the temperatures to which the end products may be exposed during its intended use. However, the melting point of the thermoplastic fibers should be low enough that the fibrous batt will take a set and compact at the edges at a reasonable thermoforming temperature, e.g., 250° F. to 350° F. Non-woven polyester fibers, particularly polyethylene terephthalate (PET) are preferred in forming the non-woven fibrous batt 12 of this invention because of their excellent elongation and molding characteristics at molding temperatures.

The fibers comprising porous fibrous batt 12 are preferably either thermobonded, i.e., heat-fused, together, or bound together by sufficient binder to bond the fibers together at points of intersection thereof, but not sufficient binder to interfere excessively with porosity. When fibrous batt 12 is comprised of thermoplastic fibers, the fibers are preferably heat-fused together at their points of intersection. Bi-component fibers comprising a core polymer having a relatively high glass transition temperature, and a sheath polymer having a relatively lower glass transition temperature may be advantageously employed in the fibrous batts 12 of this invention. When a blend of synthetic and natural fibers are used, the synthetic fibers are preferably thermoplastic fibers which are heat-fused to each other and to the natural fibers at points of intersection between the fibers. In certain cases, especially where fibrous batt 12 is comprised primarily or entirely of natural fibers, it will be desirable to bond the fibers to one another at points of intersection between the fibers using a thermoplastic binder resin. Examples of suitable binding resins include water dispersed acrylic, ethylene vinyl acetate acrylic, styrene butadiane rubber, polyvinyl acetate and polyvinyl acrylic copolymer.

Fibrous reinforcing mats 16, 18 and 20 are relatively thin, non-extendable, porous mats comprising a plurality of random length, randomly dispersed fibers (or a continuous monofilament strand laid in an overlapping pattern) either thermobonded, i.e., heat-fused, together or bonded together by sufficient binders to bond them (or the bond a single strand upon itself where it overlaps), but not sufficient binder to interfere excessively with porosity. The fibers are primarily oriented in the plane of the mat. Fibrous mats 16, 18 and 20 are sufficiently thin that they do not begin to generate a boardy sound or feel. A thickness of from about 10 to about 20 mils (0.010 to 0.020 inches) is preferred. Suitable glass fiber mats can be obtained, for example, from Gevetex Aachen GmbH of Germany in the monofilament version at 150 grams per square meter or in the staple or plural fiber version at 150 grams per square meter.

Fibrous mats 16, 18 and 20 are non-extendable in the sense that they will not stretch when exposed to heat in the range of from about 185° C. to about 250° F., the critical environmental testing temperature for automobile headliners. If mats 16, 18 and 20 were extendable when exposed to such temperatures, headliners formed from such mats would tend to sag when exposed to heat.

It is also important that fibrous reinforcing mats 16, 18 and 20 be porous to a sufficient degree that they do not act as sound reflectors in the same sense as a sheet of kraft paper, a polymer film or a layer of rigid glass fiber reinforced resin. The porosity of mats 16, 18 and 20 allow sound to penetrate and be absorbed by the non-woven fiber batt 12 rather than bounce off mats 16, 18 and 20. While precise measures of porosity are difficult to specify and while there will be a great deal of latitude allowed to those skilled in the art, mats 16, 18 and 20 are preferably sufficiently porous that one can gently blow air at them and feel the air coming through the other side. Typically, mats 16, 18 and 20 will have a light porosity or void spaces in the range from 60 to 80%, preferably 70%, determined by the percentage of light passing through the mat. Air porosity for such mats will be an access of 90%, e.g., 98%.

Fibrous reinforcing mats 16, 18 and 20 are formed from fibers having a softening temperature which is greater than that of the fibers comprising fibrous batt 12. Preferably the fibers used in reinforcing mats 16, 18 and 20 will not soften at temperatures below 350° F., more preferably fibers which will not soften at temperatures below 400° F., and most preferably fibers which will not soften at temperatures below 500° F. High melting points polyester fibers are acceptable, i.e., fibers having a softening temperature at temperatures above about 400° F. Glass fibers are most preferred, especially glass fibers having a softening temperature in access of 500° F.

In accordance with a preferred mode, fibrous reinforcing mats 16, 18 and 20 may comprise a plurality of glass fibers bonded together by a resin. The mats are preferably from about 10 to 20 mils thick. The glass fibers are chopped from roving in which the individual fibers are approximately 10 microns thick. The fibers typically have a specific gravity of about 2.5 to 2.7. The weight of the glass in the glass fibrous reinforcing mats 16, 18 and 20 is preferably from about 80 to 150 grams per square meter.

Figure 1:
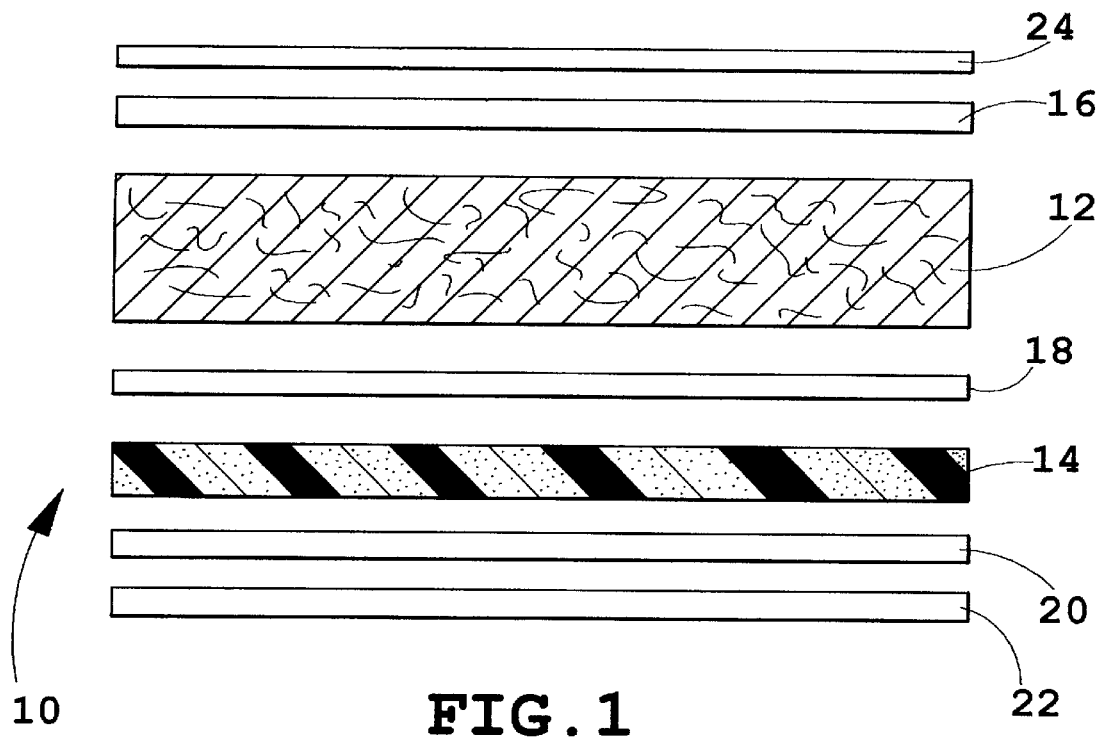
FIG. 1 schematically illustrates a cross-sectional view of a laminated structure formed in accordance with the invention with the laminate layers shown separated for convenient illustration.

The amount of resin binder used to adhere fibrous reinforcing mats 16, 18 and 20 to the adjacent layers 12, 14, 22 and 24 as shown in FIG. 1, is preferably from about 15 grams per square meter to about 45 grams per square meter, e.g., 30 grams per square meter, although higher amounts may be used, provided that the binder does not interfere excessively with porosity, and lower amounts may be used provided that sufficient adherence between the layers is achieved. Suitable binding resins include heat curable thermosetable resins which may be applied in liquid form, and which remain liquid until heated in a thermoforming molding tool. Examples of suitable thermosetable resins include phenolic resin, urethane resin and melamine resin, with urethane resin being preferred. An example of a suitable thermosetting resin is an elastomeric urethane composition comprising 100 parts by weight of a polyol having three or four hydroxyl groups, 85 parts by weight of an isocyanate compound having at least 2 reactive isocyanate groups, such as methylene-bis-phenyl isocyanate), 0.05 to 0.10 parts of a catalyst such as tin octoate or lead naphthanate, and 5 to 20 parts of solvent such as trichlorofluoromethane or methylene chloride. The solvent serves to dilute the solution in order to facilitate its application by spraying, brushing or by an impregnating roller. An example of a commercially available elastomeric urethane resin is Butofan™ Ds 2165, available from BASF GmbH.

An alternative mat material which may work in some circumstances, but which is not as effective as the above described porous fiberglass mat is a spun-bonded polyester mat of comparable porosity and thickness. A high temperature polyester fiber must be employed. A example of such material is a 2.1 Bontex™ available from Van Waters & Rogers, Inc. of Kansas City, Kans. This material weighs in the range of 2.1 ounces per square yard at a thickness of about 20 mils, or about 15 pounds per cubic foot. The individual fiber density is about 1.38 grams per cubic centimeters. The fibers have a softening temperature in excess of 400° C. This material is somewhat less porous, given that the overall mat densities are comparable and the fiber density per se is less. Nevertheless, one can notice the passage of air through the mat when blowing air against it.

As another alternative, to using either a prefabricated glass fiber mat, or a prefabricated polyester fiber mat, the reinforcing layers 16, 18 and 20 may be prepared directly on top of an underlying adjacent layer, either before the underlying layer is placed in the thermoforming mold, or after. For example, chopped glass fibers of random length can be randomly dispersed over the back side (top side) of decorative cover 22, and a suitable binding resin may be applied before, during or after the fibers are randomly dispersed, to form a suitable fibrous reinforcing mat directly on decorative cover 22. The amount of glass which may be used is as indicated above with respect to the previously described preassembled glass fiber reinforcing mats. Polyester fiber reinforcing mats may be prepared directly on an underlying layer in a similar manner by distributing polyester fibers over the adjacent layer to achieve a weight in the range of about 2.1 ounces per square yard at a thickness of about 12 mils, as described above with respect to the preassembled polyester mat.

As a further alternative, the reinforcing mat may be comprised of natural fibers or a blend of natural fibers and other fibers, such as glass and/or thermoplastic. Reinforcing mats comprising natural fibers may be prefabricated or prepared directly on an adjacent layer of the laminate, as discussed herein with respect to glass fibers. Preferred natural fibers include sisal, abaca and coconut fibers, with sisal being preferred.

Decorative cover sheet 22 which covers the front side (the underside or passenger compartment side) of fibrous reinforcing layer 20 is preferably a porous fabric material. A porous fabric will provide minimum interference with the porosity of the end product. A preferred fiber for such fabric would be thermoformable so that cover 22 can be applied to the uncured resin coated surface of reinforcing layer 20 prior to thermoforming. The cured resin then serves as the adhesive to bond cover 22 in place in the final product. A particularly preferred thermoformable polymeric fabric cover sheet comprises a nylon warp knit cloth material.

Even if a nonporous cover 22 is used, laminate 10 will still provide excellent sound deadening characteristics, i.e., will deaden vibrations of a sound generator. However, porosity is preferred so as not to interfere with the excellent sound absorbing characteristics of porous batt 12.

Release layer 24 is preferably a porous cloth scrim. Release layer 24 is adhesively secured to fibrous reinforcing mat 16. Release layer 24 prevents sticking of laminate 10 to the thermoforming molding tool surface during the thermoforming operation. After the thermosetable resin has cured in the molding tool, a contoured laminate 20 (shown in FIG. 2) is easily removed from the thermoforming molding tool. The porosity of layer 24 is not critical since it will be on the top side (upper or roof side) of the product in use and sound can still be absorbed through the exposed porous surface of cover 22.

Rigid foam layer 14 serves two important functions in composite laminate 10. First, the use of a relatively thin rigid foam in combination with a fibrous batt in a composite laminate structure provides significantly enhanced sound absorbing characteristics relative to a laminate of similar thickness, character and structure which does not include a rigid foam layer. Second, the rigid foam layer provides the laminate with improved overall stiffness and/or shape retention properties at relatively high temperatures, whereby the compressed, thermoformed headliner can be removed from the molding tool at a relatively high temperature, as compared with a similar composite article which does not include a rigid foam layer, without sagging or otherwise deforming or losing its shape. For example, a typical thermoforming temperature in the thermoforming molding tool is approximately 130° C. When a laminate of the type generally described herein, but not having a rigid foam layer, is subjected to thermoforming in a thermoforming molding tool to form a porous three-dimensional configuration, the resulting article, and hence the thermoforming molding tool, must be allowed to cool to a temperature of approximately 70 to 75° C. before it can be removed from the thermoforming molding tool. By contrast, the rigid foam provides relatively high temperature rigidity and/or shape-retention characteristics which allow the thermoformed article to be removed from the thermoforming molding tool at a much higher temperature. This ability to remove the thermoformed article from the molding tool at a higher temperature results in higher production rates. In particular, the molding tool does not have to be cooled as much after thermoforming, and does not have to be heated as much after a finished article has been removed. Accordingly, the cycle time, (i.e., the time required to form a single three-dimensionally contoured article) can be significantly reduced by utilizing the rigid foam layer 14. Preliminary results indicate that cycle times can be typically reduced by about 30% or more.

A rigid foam, as used herein, means a thermosetting or thermoplastic foam having low elongation, flexibility and resilience. More specifically, rigid foams refer to foams in which a deformation results in a non-recoverable change.

Suitable rigid foams include rigid urethane foam, and other foams exhibiting a similar rigidity or lack of flexibility. Examples of other rigid foam materials which may be suitably employed in layer 14 include other thermosetting foams such as epoxy, isocyanurates, phenolics, silicone and urea formaldehyde foams, and thermoplastic foams such as polystyrene and polyolefin foams. However, rigid polyurethane foams are preferred. The rigid foam layer 14 will preferably have a thickness of from about 2 to 5 millimeters. Thicknesses below 2 millimeters are not preferred because in general, they do not exhibit suitable high temperature shape retention characteristics. Thicknesses greater than about 5 millimeters are not preferred because they add unnecessary and undesirable additional thickness to the finished three-dimensionally contoured laminate article without providing any significant additional benefit beyond those that would be achieved using a thickness of approximately 5 millimeters.

Rigid foam layer 14 should be sufficiently porous so that one can gently blow air at one side of layer 14 and feel the air coming through the other side. This can be achieved by providing a suitable combination of cell size and percentage open cells in the foam structure. Those having ordinary skill in the art will not have any undue difficulty in selecting appropriate reactants, catalysts, cell stabilizers, blowing agents and operating temperatures and pressures for achieving the porosity needed for achieving desired sound absorbing properties in the laminate.

Laminate 10 may be produced by advancing individual webs of material toward a thermoforming station. For example, webs of fibrous batt 12, reinforcing mats 16 and 18, and a web of release layer 24 may be brought together, after a suitable binding resin has been applied to at least one of the interfacing surfaces of adjacent layers. The liquid thermosetable binding resin can effect temporary adhesion between the layers prior to thermoforming. Likewise, a web of cover sheet 22 and a web of fibrous reinforcing batt 20 may be brought together after a suitable binding resin has been applied to at least one of the interfacing surfaces of adjacent layers 20 and 22. Again, the liquid thermosetable binding resin can act to form a temporary laminate which can be advanced to the thermoforming station. The temporary laminate comprising layers 20 and 22 can be cut to an appropriate size and placed in the lower portion of a thermoforming molding tool. Additional binding resin may be applied to the underside of rigid foam layer 14 or the top side of fibrous reinforcing layer 20, before rigid foam layer 14 is positioned over the temporary laminate comprising layers 20 and 22. Thereafter, the temporary laminate comprising webs of layers 24, 16, 12 and 18 can be cut to an appropriate size and positioned over rigid foam layer 14. Before positioning the temporary web comprising layers 24, 16, 12 and 18 over rigid foam layer 14, additional binding resin may be applied to the underside of fibrous reinforcing layer 18 and/or to the top side of rigid foam layer 14.

As an alternative, each of the individual layers can be cut to an appropriate size and stacked in an appropriate manner, with sufficient binding resin present between the interfacing surfaces of the adjacent layers. As another alternative, layers 16, 18 and 20 may be formed directly on an adjacent layer, as described above. Molding of laminate 10 to produce the shape of configured part 20 (FIG. 2) is effected under conditions of heat and pressure sufficient to effect curing of the thermosetable binding resin, to set the thermoformable fibers of fibrous batt layer 12 into their new shape and to compress those fibers at the laminate periphery, including the peripheries of any openings which may be formed in laminate 10, to form a dense unitary bond line. Any changes in the thicknesses of layers 24, 16, 18, 14, 20 and 22 brought about by the thermoforming operation do not appreciably affect the overall thickness of the finished article. However, during the thermoforming operation, the fibrous batt layer 12 can be compressed to a substantially reduced thickness. The thickness of layer 12 of the finished article will vary generally from about 1.5 to about 25 millimeters. During the thermoforming operation, the surfaces of the thermoforming molding tool are at an elevated temperature, such as about 130° C. The molding pressure, i.e., the amount of force applied to the upper half of the molding tool is approximately 150 to 225 metric tons per square meter.

A major advantage with the headliners and laminates of the present invention is that they may be designed, or tuned, to provide particularly enhanced sound absorption/deadening properties for selected frequency ranges. Specifically, it has been determined that laminate articles in accordance with the invention can be tuned for absorbing sounds at selected frequencies or selected frequency ranges by adjusting the porosity and/or density of the rigid foam layer 14. Porosity and density are not entirely mutually exclusive parameters. In particular, porosity tends to decrease as density increases. Porosity is also a function of cell size and the percentage of closed cells versus open cells. In general, better absorption of low frequency sounds can be achieved by providing the laminate of this invention with a rigid foam layer 14 having a relatively high density, relatively small cells, and a relatively high percentage of closed cells. When better sound absorbing properties are desired with respect to higher frequency sounds, layer 14 preferably has a relatively lower density, relatively larger cell sizes, and a relatively lower percentage of closed cells. The density of the rigid foam layer 14 can range from about 1.5 pounds per cubic foot to about 3 pounds per cubic foot. Density, cell size and percentage of closed cells can be easily manipulated by those having ordinary skill in the art by appropriate selection of the hydroxyl terminated molecules and isocyanates used to form the rigid urethane foam, and by appropriate selection of blowing agents, cell stabilizers and catalysts. Additionally, the overall sound absorbing/deadening properties of the laminate can be adjusted by varying the thickness of the rigid foam layer 14 and/or varying the density of fibrous batt layer 12. More specifically, higher thicknesses for layer 14 and higher densities for layer 12 will provide generally improved sound absorption/deadening characteristics which, are substantially independent of sound frequency.

The laminated articles of this invention are suitable for use as decorative sound absorbing panels for a variety of automotive applications, including door panels, dashboard panels, console panels, etc., and are particularly well suited for use as vehicle headliners.

Of course it is understood that the above is merely the preferred embodiment and that changes and alterations can be made without departing from the spirit and broader aspects thereof.

What is claimed is:

1. A thermoformable laminate comprising:
   a porous fibrous batt layer;
   a porous rigid foam layer;
   a reinforcing layer disposed between the fibrous batt layer and the rigid foam layer, the reinforcing layer comprising fibers having a softening temperature greater than fibers of which the fibrous batt is comprised.

2. The laminate of claim 1, wherein a thermosettable resin is disposed at interfacing surfaces between the fibrous batt layer and the reinforcing layer, and between the reinforcing layer and the rigid foam layer.

3. The laminate of claim 2, wherein the thermosettable resin is selected from phenolic, urethane and melamine resins.

4. The laminate of claim 1, wherein the fibrous batt layer is comprised of natural fibers, synthetic fibers, or a blend thereof.

5. The laminate of claim 1, wherein the fibrous batt layer is comprised of thermoplastic fibers.

6. The laminate of claim 1, wherein the fibers batt is comprised of polyester fibers.

7. The laminate of claim 1, wherein the fibrous batt is comprised of polyethylene terephthalate fibers.

8. The laminate of claim 1, wherein the reinforcing layer comprises glass fibers.

9. The laminate of claim 1, wherein the rigid foam layer comprises a rigid polyurethane foam.

10. The laminate of claim 1, wherein the fibrous batt layer is comprised of fibers having a length of from about ½ inch to about 3 inches and a denier of about 4.5 to about 25, and wherein the fibrous batt layer has a thickness of from about 15 to about 30 millimeters and a weight of from about 200 to 400 grams per square meter.

11. The laminate of claim 1, wherein the reinforcing layer has a thickness of from about 10 to about 20 mils and a weight of from about 80 to about 150 grams per square meter.

12. The laminate of claim 1, wherein the thickness of the rigid foam layer is from about 2 to about 5 millimeters.

13. A thermoformable laminate comprising:
    a porous fibrous batt layer;
    a porous rigid foam layer;
    a reinforcing layer disposed between the fibrous batt layer and the rigid foam layer, the reinforcing layer comprising fibers having a softening temperature greater than fibers of which the fibrous batt is comprised; and
    wherein the reinforcing layer comprises natural fibers.

14. The laminate of claim 13, wherein the reinforcing layer comprises sisal fibers, abaca fibers, coconut fibers or a combination thereof.

15. A molded contoured three-dimensional laminate structure comprising:
    a porous fibrous batt layer;
    a porous rigid foam layer;
    a reinforcing layer disposed between the fibrous batt layer and the rigid foam layer, the reinforcing layer comprising fibers having a softening temperature greater than fibers of which the fibrous batt is comprised; and
    wherein the reinforcing layer is adhered to the fibrous batt layer and to the rigid foam layer by a thermoset resin.

16. The laminated structure of claim 15, wherein the fibrous batt layer is comprised of thermoplastic fibers.

17. The laminated structure of claim 16, wherein the thermoplastic fibers are polyester fibers.

18. The laminated structure of claim 17, wherein the polyester fibers are polyethylene terephthalate fibers.

19. The laminated structure of claim 18, wherein the reinforcing layer comprises glass fibers.

20. The laminated structure of claim 19, wherein the thermoset resin is selected from phenolic, urethane and melamine resins.

21. The laminated structure of claim 20, wherein the rigid foam layer comprises a rigid polyurethane foam.

22. The laminated structure of claim 21, wherein the fibrous batt layer is comprised of fibers having a length of from about ½ inch to about 3 inches and a denier of about 4.5 to about 25, and wherein the fibrous batt has a weight of from about 200 to 400 grams per square meter.

23. The laminated structure of claim 22, wherein the reinforcing layer has a thickness of from about 10 to about 20 mils and a weight of from about 80 to about 150 grams per square meter.

24. The laminated structure of claim 23, wherein the thickness of the rigid foam layer is from about 2 to about 5 millimeters.

25. The laminated structure of claim 24 configured as a vehicle headliner.

26. A molded contoured three-dimensional laminated structure comprising:
    a porous fibrous batt layer;
    a porous rigid foam layer;
    a reinforcing layer disposed between the fibrous batt layer and the rigid foam layer, the reinforcing layer comprising fibers having a softening temperature greater than fibers of which the fibrous batt is comprised; and
    wherein the reinforcing layer comprises natural fibers.

27. The laminated structure of claim 26 wherein the reinforcing layer comprises sisal fibers, abaca fibers, coconut fibers or a combination thereof.

* * * * *

UNITED STATES PATENT AND TRADEMARK OFFICE
CERTIFICATE OF CORRECTION

PATENT NO.   : 6,204,209 B1
DATED        : March 20, 2001
INVENTOR(S)  : Rozek et al.

It is certified that error appears in the above-identified patent and that said Letters Patent is hereby corrected as shown below:

Column 4,
Line 10, "+1to" should be -- to --.

Column 5,
Line 23, delete "the".

Amendment B, column 6,
Line 15, "an access" should be -- in excess --.

Column 6,
Line 24, "access" should be -- excess --.

Column 7,
Line 12, "methylene-bis-phenyl isocyanate" should be -- methylene-bis(phenyl isocyanate) --.
Line 20, "A" should be -- An --.
Line 24, "centimeters" should be -- centimeter --.

Column 13, claim 6,
Line 1, "fibers" should be -- fibrous --.

Signed and Sealed this

Sixth Day of November, 2001

Attest:

NICHOLAS P. GODICI
Attesting Officer    Acting Director of the United States Patent and Trademark Office